(12) United States Patent
Shuma et al.

(10) Patent No.: US 8,285,691 B2
(45) Date of Patent: Oct. 9, 2012

(54) BINARY METHOD FOR LOCATING DATA ROWS IN A COMPRESSED DATA BLOCK

(75) Inventors: Kevin P. Shuma, Celina, TX (US); Joseph B. Lynn, Plano, TX (US); Robert Florian, Dallas, TX (US)

(73) Assignee: CA, Inc., Islandia, NY (US)

( * ) Notice: Subject to any disclaimer, the term of this patent is extended or adjusted under 35 U.S.C. 154(b) by 191 days.

(21) Appl. No.: 12/749,613

(22) Filed: Mar. 30, 2010

(65) Prior Publication Data

US 2011/0246436 A1 Oct. 6, 2011

(51) Int. Cl.
*G06F 7/00* (2006.01)

(52) U.S. Cl. .......................... 707/693; 707/705

(58) Field of Classification Search ............ None
See application file for complete search history.

(56) References Cited

U.S. PATENT DOCUMENTS

| 5,517,641 | A | * | 5/1996 | Barry et al. ...................... 1/1 |
| 7,769,728 | B2 | * | 8/2010 | Ivie ............................... 707/693 |

* cited by examiner

*Primary Examiner* — Fred I Ehichioya
*Assistant Examiner* — Hasanul Mobin
(74) *Attorney, Agent, or Firm* — Womble Carlyle Sandridge & Rice, LLP

(57) ABSTRACT

A system and method is provided for locating one or more compressed data rows in a data block. A 16 byte "row map" may be added at the end of each compressed data block. The row map may provide seven binary address points in the compressed data block (i.e., by dividing the compressed data block into 8ths).

18 Claims, 4 Drawing Sheets

BINARY METHOD FOR LOCATING DATA ROWS IN A COMPRESSED DATA BLOCK

TECHNICAL FIELD

The invention relates to the field of relational database systems and products. More particularly, the invention relates to managing the searching for data rows in relational databases.

BACKGROUND

Mainframe relational database products are typically very large and complex software packages that provide the ability to manage and execute hundreds/thousands of requests per minute for thousands of concurrent users.

Many database environments provide a facility to compress data structure before storing them on a physical DASD (Direct Access Storage Device) device. The upside to data compression is that the number of bytes stored on the DASD device is diminished. For products that use data block to data buffer management facilities (for example, a database), typically more data rows can be retrieved in compressed form into a given data buffer. The downside to data compression is the extra software instructions (i.e., CPU overhead) required to compress data rows and then decompress the data rows.

As the size of the data block (and therefore the data buffer) is increased, the processing time for randomly retrieving a selected data row from a given data buffer also increases. For non-compressed rows, a selected data block may be retrieved into the data buffer and a binary search may be performed on the data block for a given row with minimal processing because the row number within the block and the row size is known to the database (based on index entries, for example). For compressed data rows, on the other hand, the row length stored on DASD and retrieved to the data buffer may vary according to the amount of compression achieved. Due to this variation, a binary search for the data row cannot be performed. A sequential-skip processing may be performed. For example, to find a data row with row id 5 in a compressed data block, a processor may start the search at the beginning of the data block, obtain a compressed length of a data row with row id 1, skip that amount to the beginning of the next data row (for example, data row with row id 2), obtain the compressed length of the next data row, and repeat the skip processing until the data row with row id 5 is reached. At that point, the data row with row id 5 may be decompressed.

With increased data block/data buffer sizes, the ability to store more compressed data rows per block increases. The increased number of data rows per block increases the sequential-skip processing needed to locate rows at the end of the larger data blocks.

These and other drawbacks exist.

SUMMARY

In some implementations, the invention relates to a system and method for locating one or more data rows in one or more compressed data blocks. A compressed data block may refer to a data block that stores one or more compressed data rows. A 16 byte "row map" may be added at the end of each compressed data block. The row map may provide seven binary address points in the compressed data block (i.e., by dividing the compressed data block into 8ths).

To locate a particular data row in the compressed data block, the row map may be utilized to find the location of the $1/8^{th}$ of the data block it resides in (for example, with three binary compares). Thereafter, sequential-skip processing may be utilized to locate the data row within the $1/8^{th}$ of the data block.

By adding the binary $1/8^{th}$ points (as a row map) at the end of compressed data blocks, large data blocks may be divided into 8 sub-blocks and a portion of the data block that a compressed row resides in can be found by a few binary compare instructions. For large compressed data blocks with large number of data rows significant benefit in terms of speed of retrieving data rows is achieved.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
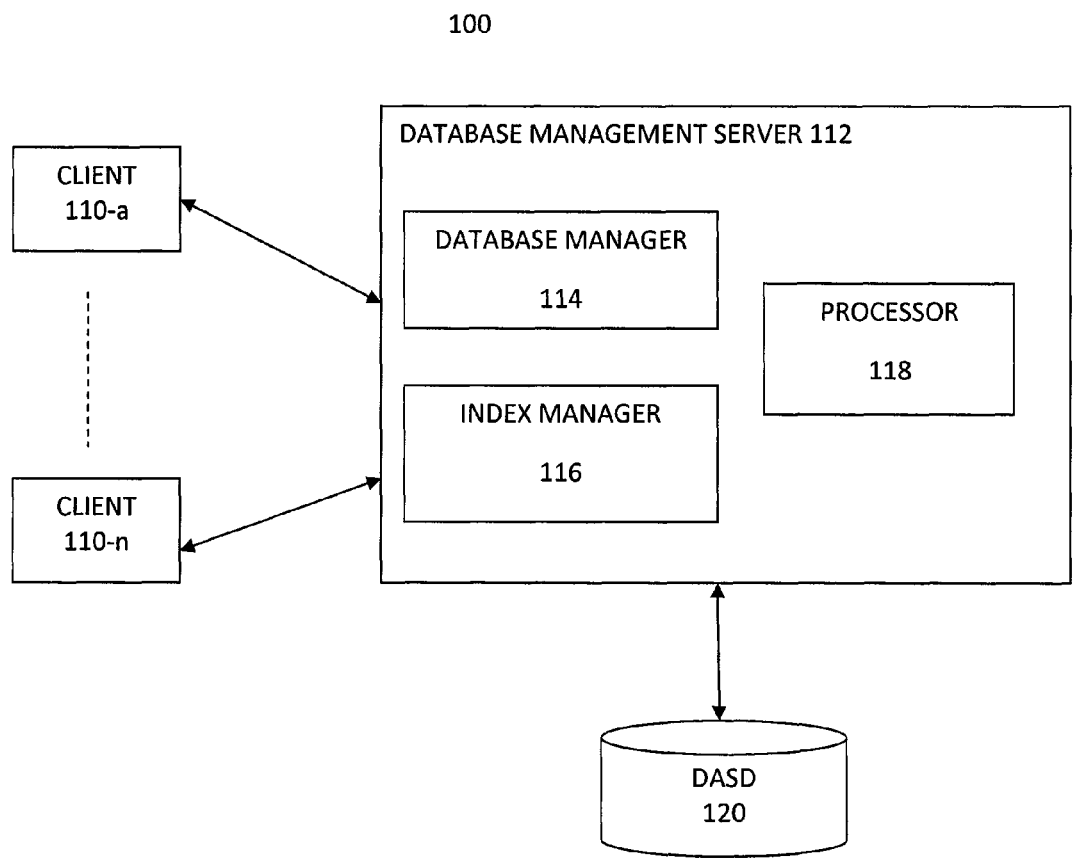
FIG. 1 illustrates an exemplary database management system, according to various aspects of the invention.

FIG. 1 is an exemplary illustration of a database management system 100, according to an aspect of the invention. Database management system 100 may include, among other things, at least a database management server 112 that is configured to manage one or more relational databases and/or indexes for the relational databases. Database management server 112 may be communicatively coupled to one or more data storage access devices (DASD) 120 that may store/maintain one or more database tables associated with relational database(s), store/maintain one or more indexes for the tables in the database(s), and/or other data structures. Database management server 112 may include a processor 118, circuitry and/or other hardware operable to execute computer-readable instructions. According to one aspect of the invention, database management system 100 may include one or more tangible computer-readable storage media configured to store one or more software modules, wherein the software modules include computer-readable instructions that when executed by the processor cause the processor to perform the functions described herein. According to one implementation, database management server 112 may comprise computer hardware programmed with a computer application having one or more software modules that enable the various features and functions of the invention. Non-limiting examples of the software modules in the application may include one or more of a database manager 114, an index manager 116, and/or other modules for performing the features and functions described herein.

Database administrators (or other users) may interact with the database management server 112 via one or more client devices 110-*a*, . . . , 110-*n*. Client devices 110*a*, . . . , 110-*n* may each comprise a user interface (not shown) that may enable users to perform various operations that may facilitate interaction with database management server 112 including, for example, providing requests to retrieve information from database tables, create tables, add/delete/update rows/columns in tables, create/delete/update/access one or more indexes associated with the tables, and/or performing other operations. Client devices 110*a*, . . . , 110-*n* may include a processor (not shown), circuitry, and/or other hardware operable to execute computer-readable instructions.

According to one implementation, database manager 114 may manage various operations performed on the relational database(s) stored in DASD 120 and/or one or more database tables in the relational database(s). For example, database manager 114 may receive requests (for example, user requests, and/or other requests) to create table(s), add row(s)/column(s), delete row(s)/column(s), update row(s)/column(s), retrieve information from row(s)/column(s), and/or other requests. Database manager 114 may convert the requests to queries that may be run against the relational database(s) and may accordingly create one or more tables in the database(s), add one or more rows/columns to the tables in database, delete one or more rows/columns from the tables in database, update one or more rows/columns in the tables in database, retrieve requested information from the tables in database, and/or perform other operations. In order to retrieve requested information from the database, database manager 114 may access one or more tables specified by the query (and/or request) to determine the information within the tables that matches a given request criteria specified in the query. Database manager 114 may then retrieve the determined information from the tables and provide it to the user.

In some implementations, database tables and/or data rows in the database tables may be compressed by database manager 114 before storing them on DASD 120 in the form of, for example, compressed data blocks. Thus, the various operations described above may be performed by database manager 114 on the compressed tables/rows. As such, database manager 114 may perform appropriate compression and decompression of the rows based on the operations that need to be performed. For example, if a data row is added to the database and is to be stored in a data block in DASD 120, database manager 114 may compress the data row and store the compressed data row in the appropriate data block. Each data row as it is added to the database is assigned a unique ascending id (i.e., row id) within the database. Each of these added rows with their row ids is then stored in a data block (which may be considered a physical DASD location). If a compressed data row is to be retrieved from a data block in DASD 120 in response to a user request, database manager may locate the compressed data row to be retrieved, retrieve the compressed data row, decompress the retrieved data row and provide the decompressed data row to the user in response to the user request. The compression techniques utilized by database manager 114 may be a simple technique wherein three repeating characters may be converted to a character with a special bit inclusion, a complex compression scheme based on Huffman encoding, and/or other techniques without departing from the spirit of the invention. In one implementation, database manager 114 may store a row length associated with the compressed data row along with or separate from the compressed data row itself. The row length stored by database manager 114 may vary for each data row in the database according to the amount of compression achieved.

According to one implementation, index manager 116 may manage creation, deletion, updating, access, and/or other operations associated with one or more indexes for the tables in the relational database(s). Index manager 116 may create one or more indexes on one or more columns of one or more tables. An index entry may refer to one entry or index value that is in the index and references a given data row(s) of the database table. An index entry may consist of the value(s) contained in the column(s) being indexed for a given data row, and a pointer to the data row (referred to herein as data row pointer). The data row pointer may consist of a data block number/id within which the data row resides, and the unique row id. Most access requests within the relational database environment are based on index access. Index access typically refers to the pre-definition of a specific access path that is created using the value(s) of data column(s). Once created, the database can quickly retrieve data rows that have an index entry (data column value) that matches a given request criteria.

When a data row (for example, a compressed data row) is added to an indexed table, database manager 114 may provide an indication of the row addition to the index manager 116. Index manager 116 may accordingly, create an index entry in the index associated with the indexed table using the data value of the indexed column(s). Similarly, when a data row (for example, a compressed data row) is deleted from or updated in an indexed table, database manager 114 may provide an indication to the index manager 116. The index manager 116 may accordingly, delete the appropriate index entry from the index or update the appropriate index entry in the index (for example, if the indexed column data value is changed/updated). When a request to retrieve particular information from a table in a database is received by database manager 114 (for example, in the form of search queries specifying an indexed column), database manager 114 may provide an indication to the index manager 116. Index manager 116 may perform an index access to determine one or more index entries that include data values associated with the indexed column and/or that satisfy the request. Index manager 116 may provide to database manager 114, the data row pointers from the determined index entries that identify or serve as pointers to a specific data row(s) (for example, a compressed data row(s)) stored in DASD 120. Database manager 114 may accordingly retrieve one or more data rows (for example, a compressed data rows) associated with the data row pointers provided by the index manager 116 from DASD 120.

Index manager 116 may direct storage of the indexes in DASD 120. In one implementation, index manager 116 may direct storage of the indexes in a physical area in the DASD 120 that is separate from where the compressed data blocks associated with the relational database(s) are stored. In one implementation, index manager 116 may direct storage of the indexes in a separate DASD device (not shown). In one implementation, index manager 116 may utilize various index structures, for example, B-tree+(Balanced Binary Tree), and/or other index structures, to organize the indexes. The index entries containing the data values associated with indexed column(s) and the data row pointers may be stored in locations called leaves of the tree. In each index entry, the physical data block address (block within track, and track within data set) within which a given data row (for example, a compressed data row) resides may be stored. Any time a data row is moved from one data block to another, the index entry information is updated to show the new physical data block address.

Figure 2:
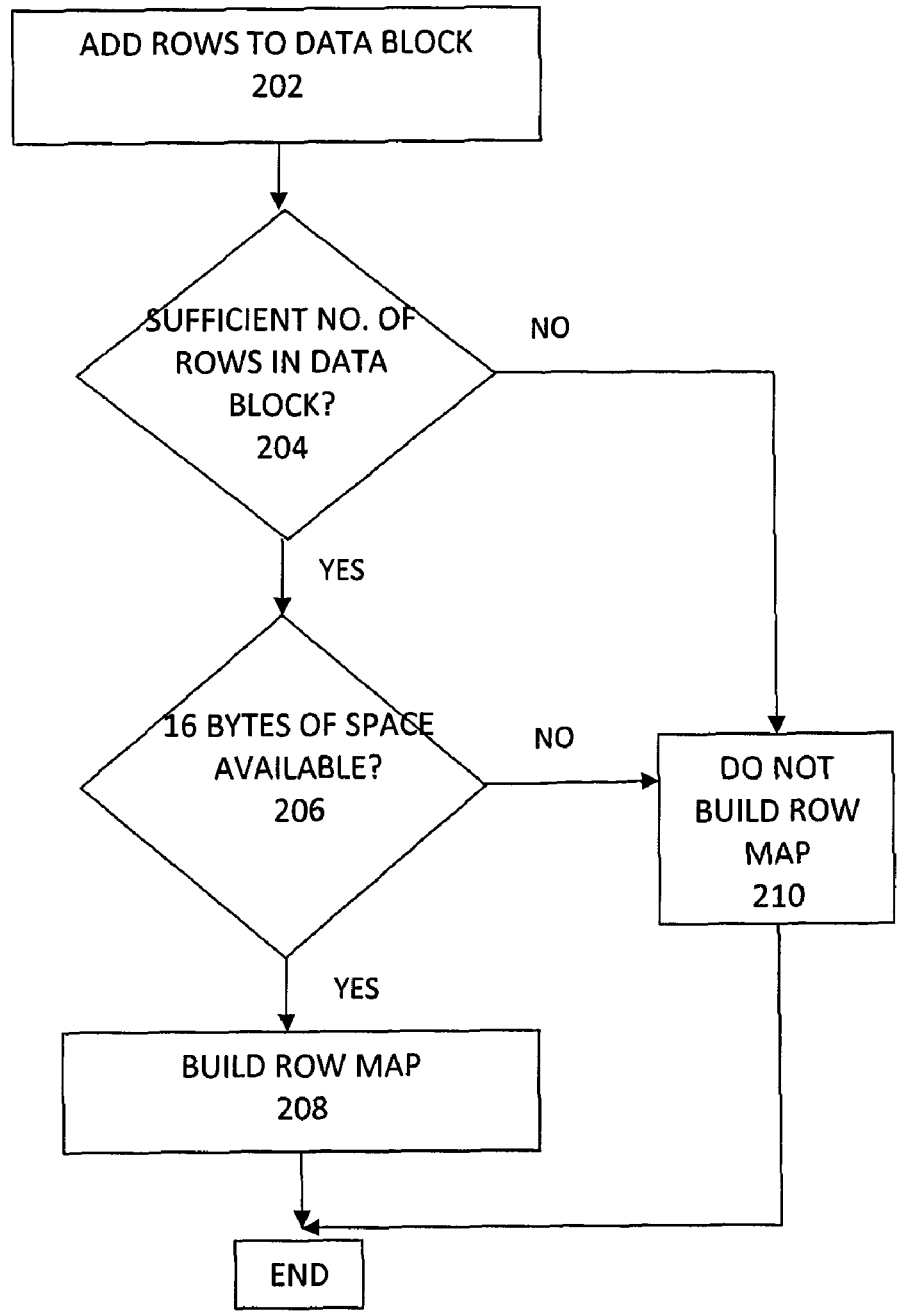
FIG. 2 is a flowchart depicting example operations performed by a database management system to build a row map, according to various aspects of the invention.

FIG. 2 is a flowchart 200 depicting example operations performed by a database management system to build a row map, according to various aspects of the invention. In some implementations, the described operations may be accomplished using one or more of the modules described herein. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting.

In operation 202, one or more compressed data rows may be added to a compressed data block in DASD 120 (by database manager 114, for example). In operation 204, database manager 114 may determine whether the data block has a sufficient number of rows to qualify for a row map. A row map may refer to a data structure, for example, a table, a list, and/or other data structure, that may occupy 16 bytes at the end of the compressed data block. In one implementation, the data block qualifies for the row map if there are at least 16 compressed data rows in the data block (i.e., the sufficient number of rows may be 16 rows). In response to a determination that the data block does not qualify for a row map, database manager 114 may not build and use the row map, in operation 210. In response to a determination that the data block does qualify for a row map, database manager 114 may determine whether the data block has 16 bytes of space available at the end of the block, in operation 206. In response to a determination that the data block does have 16 bytes of space available, a row map may be built/created by database manager 114 at the end of the compressed data block, in operation 208. In response to a determination that the data block does not have 16 bytes of space available, the row map may not be built and used, in operation 210. In some implementations, database manager 114 may provide an indication of the row addition to the index manager 116. Index manager 116 may accordingly, create an index entry in the index associated with the indexed table that contains the data row using the data value of the indexed column.

Figure 3:
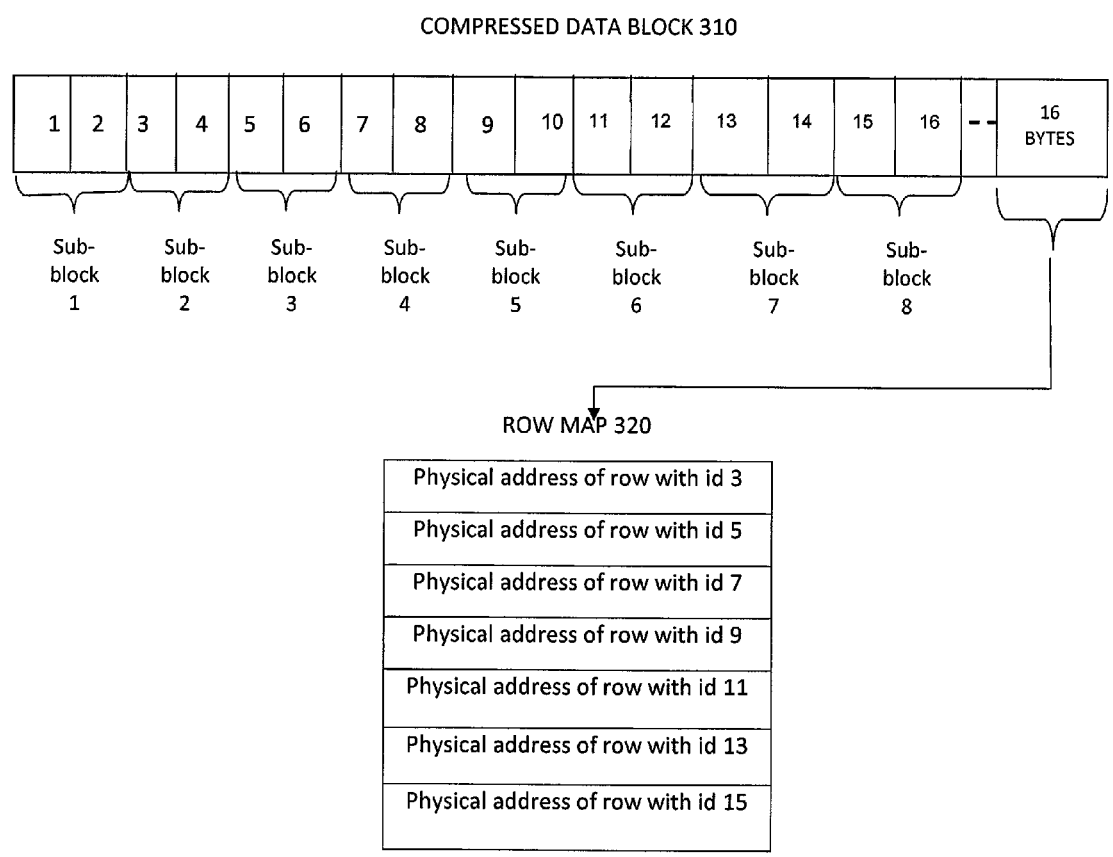
FIG. 3 illustrates an exemplary row map, according to various aspects of the invention.

If a compressed data block has 16 or more compressed data rows and 16 bytes of available space at the end of the block, for example, it qualifies for a row map. FIG. 3 depicts an exemplary compressed data block 310 with 16 rows (with row ids 1-16) and 16 bytes of available space at the end, along with an exemplary row map 320 for the compressed data block 310. Database manager 114 may build a row map that occupies the 16 bytes of available space. Database manager 114 may store the 16 end bytes on DASD 120 with the data rows. The row map may provide seven binary address points in the compressed data block (i.e., by dividing the compressed data block into 8ths). Database manager 114 may build row map 320 as follows. Database manager 114 may divide the existing number of rows (i.e., 16) by 8 and may save the result as the number of rows in an eighth ($8^{th}$). Then, starting at the front of compressed block 310, database manager 114 may identify each data row until the number of rows processed equals the saved result (i.e., number of rows divided by 8, which in this case is 2). In other words, database manager 114 may process through the compressed data block 310 (starting from the front) until the number of rows processed equals 2. When the number of rows equals 2, database manager 114 may save the physical address of the row following the last identified data row as the $1^{st}$ eighth in the row map 320. In this case, database manager 114 may store the physical address of the data row with row id 3 as an entry in the row map 320 (i.e., as the $1^{st}$ eighth in the row map 320). Database manager 114 may sequentially process through the compressed data block 310 to identify the $2^{nd}$ eighth. Starting from the data row with row id 3, database manager 114 may process through the compressed data block 310 until the number of rows processed equals 2. Database manager 114 may then store the physical address of the last identified data row as the $2^{nd}$ eighth in the row map 320. In other words, database manager 114 may store the physical address of the data row with row id 5 as an entry in the row map 320 (i.e., as the $2^{nd}$ eighth in the row map 320). Database manager may similarly sequentially process through the compressed data block 310 to identify the $3^{rd}$-$7^{th}$ eighths. Database manager 114 may accordingly save the physical addresses of the data rows with ids 7, 9, 11, 13 and 15 as entries in the row map 320 (i.e., as the $3^{rd}$-$7^{th}$ eights in the row map 320). These seven entries in the row map may be referred to as the seven binary address points in the compressed data block. As such, database manager 114 may divide the compressed data block into 8 sub-blocks based on the number of rows in the block by adding the binary $⅛^{th}$ address points (as a row map) at the end of compressed data block. In one implementation, database manager 114 may sort the compressed data block according to data row ids within the block, prior to building the row map.

The building of the row map for a compressed data block that includes 16 data rows as described above is exemplary and should not be viewed as limiting. The process of FIG. 2 can be applied to build row maps for data blocks that include more than 16 data rows. Database manager 114 may determine the seven binary address points in the compressed data block that are to be included in a row map (i.e., by dividing the logical data block into 8ths). In cases where the number of compressed data rows in the compressed data block is a number that is not divisible by 8, for example, 17, the saved result (i.e., the number of rows in an eighth) may be rounded down. The data block and row map of FIG. 3 is exemplary and should not be viewed as limiting. Also, while the data rows in the compressed data block 320 are shown as having sequential row ids 1-16 without any gaps, it will be understood by one of ordinary skill in the art that the process of building the row map may be applied to compressed data blocks that may not have data rows with sequential row ids (though the row ids may still be in ascending order).

In one implementation, the row map may be updated as and when new data rows are added to and/or data rows are deleted from the compressed data block. As each row is added to or physically deleted from the compressed data block, the row map may be rebuilt (by database manager 114, for example). Database manager 114 may count the current number of data rows in the compressed data block. If 16 or more data rows currently exist in the compressed data block, the process of building the row map is restarted as described above. If the compressed data block has less than 16 data rows, the row map is cleared/deleted. The rebuilding of the row map on each add or permanent delete is effective because maintenance is typically a small subset of requests against a given database with retrievals being much more common. Also, optimizations may be provided for utilities which are known to add large quantities of data rows so as to not build the row map until a data block is full.

Figure 4:
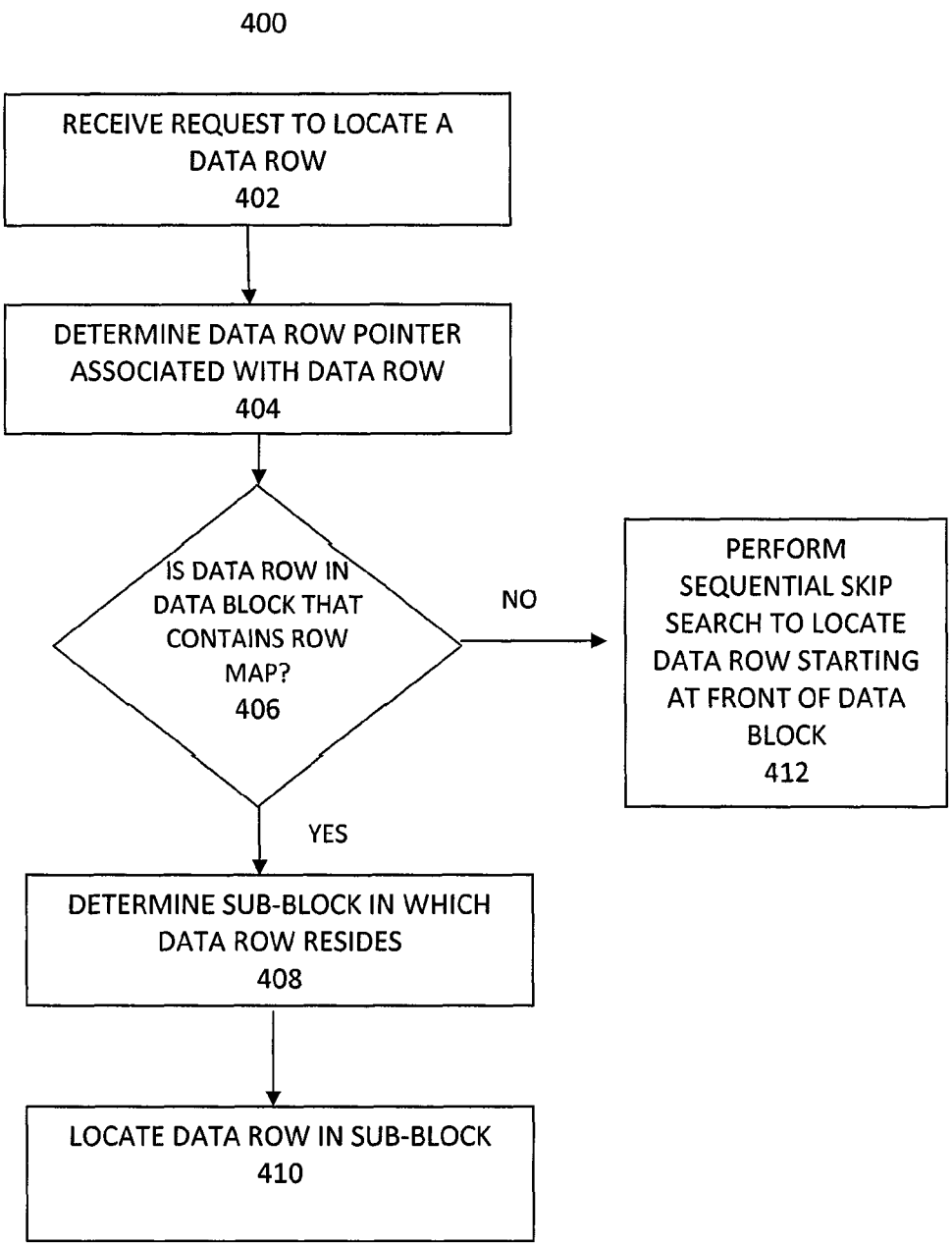
FIG. 4 is a flowchart depicting example operations performed by a database management system to locate data rows, according to various aspects of the invention.

FIG. 4 is a flowchart 400 depicting example operations performed by a database management system to use a row map when searching for/locating a given data row, according to various aspects of the invention. In some implementations, the described operations may be accomplished using one or more of the modules described herein. In some implementations, various operations may be performed in different sequences. In other implementations, additional operations may be performed along with some or all of the operations shown in FIG. 4. In yet other implementations, one or more operations may be performed simultaneously. In yet other implementations, one or more operations may not be performed. Accordingly, the operations described are exemplary in nature and, as such, should not be viewed as limiting.

In operation 402, a request may be received to locate one or more compressed data rows in a compressed data block, for example, by database manager 114. The request may be a user request (or other system/dynamic request). The request may comprise a request to retrieve particular information from a table in a database (for example, in the form of search queries specifying an indexed column(s)). The request may have one or more index entries and/or indexed column(s) associated with it. Database manager 114 may provide an indication of the request to index manager 116. In operation 404, database/index manager 116 may determine one or more data row pointers associated with the one or more compressed data rows from one or more index entries in the index that include data values associated with the indexed column and/or that satisfy the request. Index manager 116 may provide the data row pointers to database manager 114. In one implementation, when a request to retrieve information from a table (for example, in the form of search queries specifying an indexed column) is received by database manager 114, database manager 114 may provide an indication to index manager 116. Index manager 116 may perform an index access to determine one or more index entries that include data values associated with the indexed column and/or that satisfy the request. Index manager 116 may provide to database manager 114, the data row pointers from the determined index entries.

In operation 406, database manager 114 may determine whether a given compressed data row to be located is in a data block that contains a row map. Based on the data row pointer associated with the given compressed data row, database manager 114 may identify the compressed data block where the given row resides. Database manager 114 may then make a determination as to whether the identified compressed data block contains a row map. Database manager 114 may make the determination based on a bit located at the end (or other location) of the compressed block. If the bit has a value set to 1, a determination is made that the compressed data block does include a row map. If the bit has a value set to 0, a determination is made that the compressed data block does not include a row map. In response to a determination that the compressed data row is located in a data block that contains a row map, database manager 114 may utilize the row map to determine location of the sub-block (i.e., $\frac{1}{8}^{th}$ of the data block) in which the data row resides, in operation 408. Database manager 114 may determine the location of the sub-block in which the data row resides based on the row map and/or the row id of the compressed data row (obtained from the data row pointer, for example). A binary search may be performed to find the correct $8^{th}$ in which the data row resides, which significantly reduces the number of data rows which must be searched to find the data row. Once the appropriate sub-block is determined, a sequential-skip processing may be performed by database manager 114 to locate the data row within the sub-block, in operation 410. In one implementation, the sequential-skip processing may be performed by database manager 114 to locate the data row within the sub-block based on row length data associated with the compressed data rows in the sub-block. In one implementation, sequential skip processing may be started from the beginning of the sub-block. For example, if a data row with row id 4 is to be located in compressed data block of FIG. 3, database manager 114 may start processing with the data row with row id 3, may obtain that row's compressed length, may skip that amount to the beginning of the data row with row id 4, and get that row's compressed length. In response to a determination that the compressed data row is not located in a data block that contains a row map, database manager may use a pure sequential-skip search starting at the beginning of the data block, in operation 412.

Once located, the data row may be decompressed and provided to the requester in response to the request to retrieve information.

In one implementation, database manager 114 may receive a request to delete/update a compressed row from/in the data block. Similar processing as described in FIG. 4 may be performed to locate the data row to be deleted/updated in the data block. Once located, the data row may be deleted/updated. In one implementation, the data row may be decompressed prior to deleting/updating.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for locating one or more compressed data rows in a data block, the method executed by one or more processors configured to perform a plurality of operations, the operations comprising:
   receiving a request to locate at least one compressed data row of the one or more compressed data rows in the data block;
   determining a data row pointer for the at least one compressed data row;
   accessing a row map data structure contained within the data block, wherein the row map data structure is configured to include a plurality of binary $\frac{1}{8}^{th}$ physical address points, and wherein the plurality of binary $\frac{1}{8}^{th}$ physical address points were determined by dividing the data block into eight sub-blocks;
   performing a binary search to determine a sub-block within the data block in which the at least one compressed data row resides based on the row map data structure; and
   locating the at least one compressed data row in the determined sub-block based on the data row pointer.

2. The computer-implemented method of claim 1, wherein the row map data structure occupies 16 bytes at the end of the data block.

3. The computer-implemented method of claim 1, the operations further comprising:
 determining whether the at least one compressed data row resides in a data block that contains the row map data structure;
 in response to a determination that the at least one compressed data row does reside in a data block that contains the row map data structure,
 determining a sub-block within the data block in which the at least one compressed data row resides based on the row map data structure; and
 locating the at least one compressed data row in the determined sub-block.

4. The computer-implemented method of claim 1, wherein the row map data structure in the data block is created based on a determination that the data block contains at least sixteen compressed data rows.

5. The computer-implemented method of claim 1, wherein the row map data structure in the data block is created based on a determination that the data block contains at least sixteen compressed data rows and contains at least 16 bytes of space available at the end of the data block.

6. The computer-implemented method of claim 1, wherein said locating the at least one compressed data row further comprises:
 performing a sequential-skip processing to locate the at least one compressed data row in the determined sub-block based on row length data associated with one or more compressed data rows in the determined sub-block.

7. A non-transitory computer-readable storage medium having one or more computer-readable instructions thereon which when executed by one or more processors cause the one or more processors to:
 receive a request to locate at least one compressed data row of one or more compressed data rows in a data block;
 determine a data row pointer for the at least one compressed data row;
 accessing a row map data structure contained within the data block, wherein the row map data structure is configured to include a plurality of binary $⅛^{th}$ physical address points, and wherein the plurality of binary $⅛^{th}$ physical address points were determined by dividing the data block into eight sub-blocks;
 performing a binary search to determine a sub-block within the data block in which the at least one compressed data row resides based on the row map data structure; and
 locate the at least one compressed data row in the determined sub-block based on the data row pointer.

8. The non-transitory computer-readable storage medium of claim 7, wherein the row map data structure occupies 16 bytes at the end of the data block.

9. The non-transitory computer-readable storage medium of claim 7, wherein the one or more instructions further cause the one or more processors to:
 determine whether the at least one compressed data row resides in a data block that contains the row map data structure;
 in response to a determination that the at least one compressed data row does reside in a data block that contains the row map data structure,
 determine a sub-block within the data block in which the at least one compressed data row resides based on the row map data structure; and
 locate the at least one compressed data row in the determined sub-block.

10. The non-transitory computer-readable storage medium of claim 7, wherein the row map data structure in the data block is created based on a determination that the data block contains at least sixteen compressed data rows.

11. The non-transitory computer-readable storage medium of claim 7, wherein the row map data structure in the data block is created based on a determination that the data block contains at least sixteen compressed data rows and contains at least 16 bytes of space available at the end of the data block.

12. The non-transitory computer-readable storage medium of claim 7, wherein the one or more computer-readable instructions causing the one or more processors to locate the at least one compressed data row in the determined sub-block further include instructions causing the one or more processors to:
 perform a sequential-skip processing to locate the at least one compressed data row in the determined sub-block based on row length data associated with one or more compressed data rows in the determined sub-block.

13. A computer-implemented system for locating one or more compressed data rows in a data block, the system comprising:
 one or more processors configured to:
 receive a request to locate at least one compressed data row of the one or more compressed data rows in the data block;
 determine a data row pointer for the at least one compressed data row;
 accessing a row map data structure contained within the data block, wherein the row map data structure is configured to include a plurality of binary $⅛^{th}$ physical address points, and wherein the plurality of binary $⅛^{th}$ physical address points were determined by dividing the data block into eight sub-blocks;
 performing a binary search to determine a sub-block within the data block in which the at least one compressed data row resides based on the row map data structure; and
 locate the at least one compressed data row in the determined sub-block based on the data row pointer.

14. The computer-implemented system of claim 13, wherein the row map data structure occupies 16 bytes at the end of the data block.

15. The computer-implemented system of claim 13, wherein the one or more processors are further configured to:
 determine whether the at least one compressed data row resides in a data block that contains the row map data structure;
 in response to a determination that the at least one compressed data row does reside in a data block that contains the row map data structure,
 determine a sub-block within the data block in which the at least one compressed data row resides based on the row map data structure; and
 locate the at least one compressed data row in the determined sub-block.

16. The computer-implemented system of claim 13, wherein the row map data structure in the data block is created based on a determination that the data block contains at least sixteen compressed data rows.

17. The computer-implemented system of claim 13, wherein the row map data structure in the data block is created based on a determination that the data block contains at least sixteen compressed data rows and contains at least 16 bytes of space available at the end of the data block.

18. The computer-implemented system of claim 13, wherein the one or more processors configured to locate the at least one compressed data row in the determined sub-block further comprise one or more processors configured to:
  perform a sequential-skip processing to locate the at least one compressed data row in the determined sub-block based on row length data associated with one or more compressed data rows in the determined sub-block.

* * * * *